Figure 1:
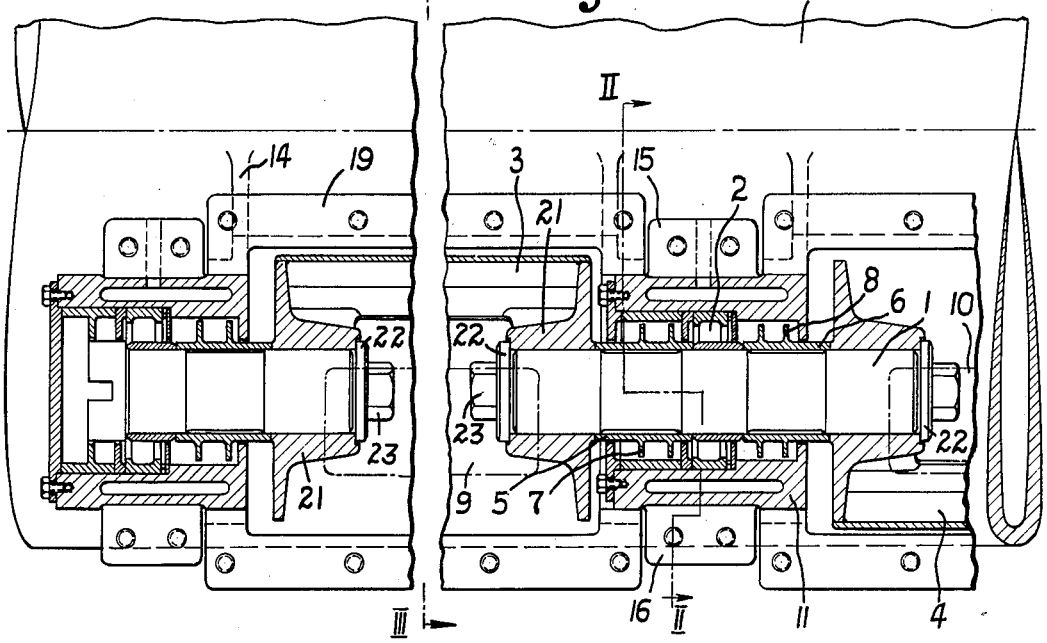

Feb. 28, 1956  G. SEIDEMANN  2,736,303
CONTROL VALVE FOR A TWO CYCLE ENGINE
Filed Nov. 8, 1951  2 Sheets-Sheet 1

INVENTOR
GEORG SEIDEMANN
BY *Marechal Biebel French & Bugg*
ATTORNEYS

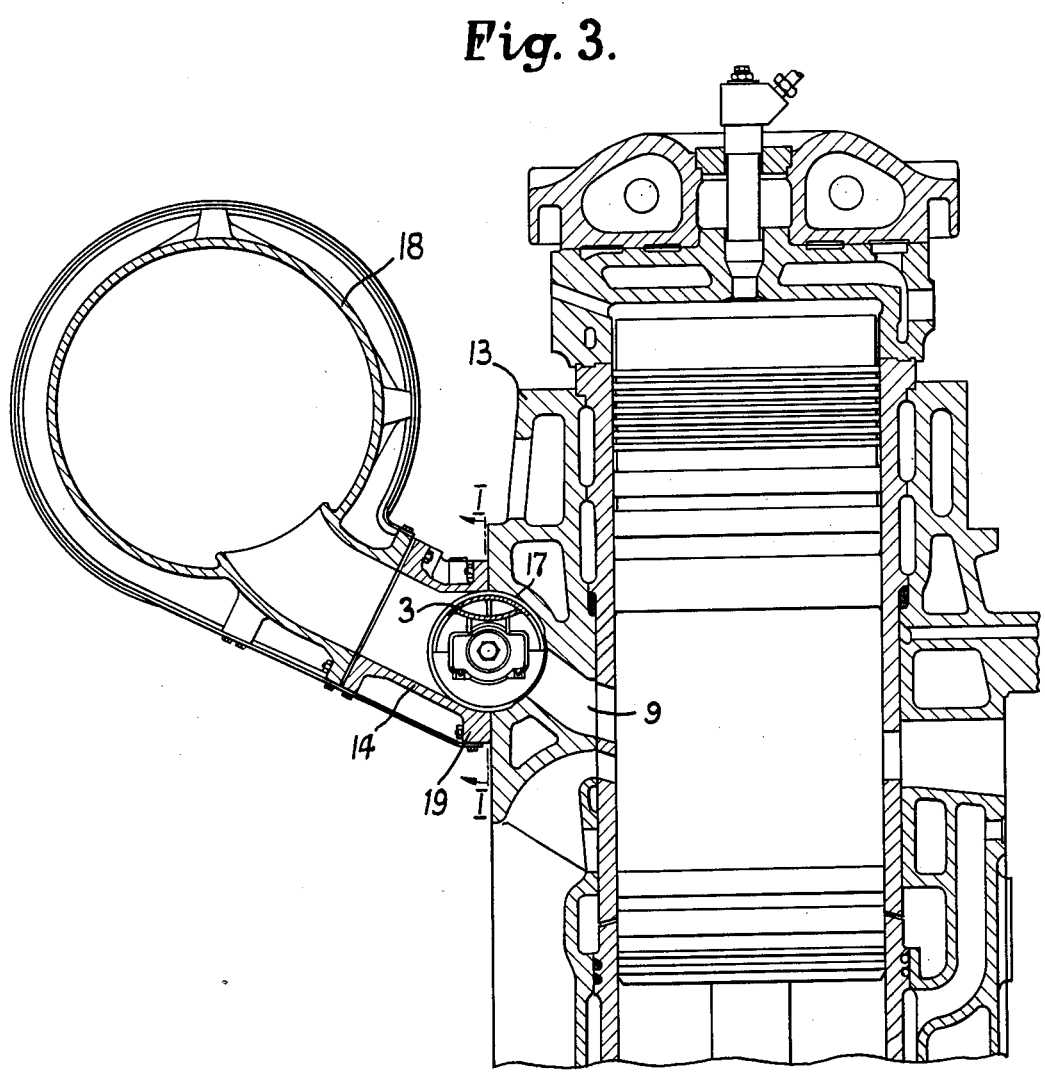

United States Patent Office 2,736,303
Patented Feb. 28, 1956

2,736,303

CONTROL VALVE FOR A TWO CYCLE ENGINE

Georg Seidemann, Augsburg, Germany, assignor to Maschinenfabrik Augsburg-Nurnberg A. G., Augsburg, Germany, a corporation of Germany Application November 8, 1951, Serial No. 255,351

Claims priority, application Germany December 28, 1950

9 Claims. (Cl. 123—59)

This invention relates to certain improvements in internal combustion engines, more particularly two-cycle engines of the type having piston-controlled ports and symmetrical control characteristics and has special reference to a bearing arrangement for the shaft of the rotary slide valve intended to close the exhaust port and preventing the charging air from flowing off.

In two-cycle engines of the type referred to the exhaust ports are still open for a certain period of time on termination of the scavenging period. The compression already produced in the cylinder during the scavenging period is thus lost and a part of the charge is forced out again by the piston. Various methods have been proposed to avoid this loss of charge. A particularly effective method consists in controlling the normal exhaust ports additionally by a slide valve which serves to close the exhaust port when the scavenging is about to be finished, and to prevent the charging air from flowing off. Such rotary slide valves are usually controlled by a common shaft extending along the whole row of cylinders. The slide valves themselves in this case are arranged very close to the cylinder. The bearing of the shaft of the rotary slide valve is designed in such a way that an unlimited longitudinal expansion is possible.

It is an object of the present invention to provide a bearing construction for rotary slide valves of the type referred to which permits easy assembly, easy accessibility of the fixing screws, and a simple and tight packing or sealing arrangement.

Another object of the invention is to reduce the amount of machining work required for this bearing.

Still another object of the invention is to reduce the transmission of heat to the bearing.

With these and further objects in view, according to the present invention the bearing body or housing is made in the form of an integral hollow body without end flanges which is partly held in position by the exhaust pipes enclosing one half of the periphery of the bearing housing, with a tight fit. Two lugs which are cast on serve to secure the bearing housing to the cylinder by means of easily accessible screws when the exhaust pipes are removed. The bearing housing itself owing to its cylindrical outer superficies on the one hand ensures the proper location and alignment of the exhaust pipe and on the other hand owing to its tight fit between the cylinder jacket and the exhaust pipe provides the packing or sealing against leaking gases and lubricants.

Other and further objects, features and advantages of the invention will be pointed out hereinafter and appear in the appended claims forming part of the application.

In the accompanying drawing a now preferred embodiment of the invention is shown by way of illustration and not by way of limitation.

Figure 2:
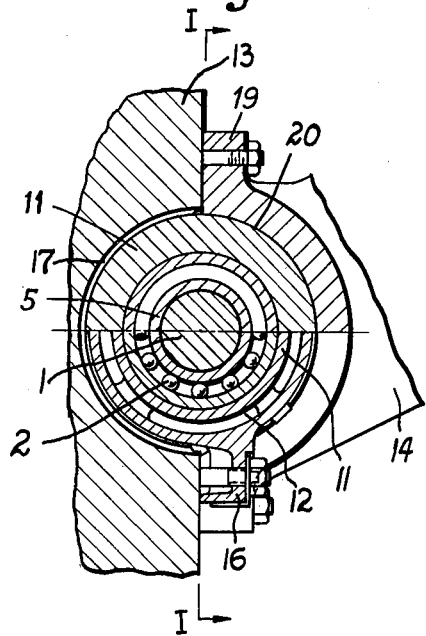

Fig. 1 is an axial section through a bearing disposed between two cylinders along the lines 1—1 of Figs. 2 and 3, and Fig. 2 is a section through the bearing on line II—II of Fig. 1, and Fig. 3 is a section through one cylinder and its appertaining exhaust connection and ports along the line III—III in Fig. 1.

Referring to the drawings, it will be seen that the shaft 1 of the rotary slide valve is mounted for rotation in a roller bearing 2, each of its two ends bearing one of the hub portions 21 of the rotary slide valves 3 and 4. The accurate distance between said slide valves is defined by spacing sleeves 5 and 6 having flanges or collars 7 and 8 serving to form a labyrinth packing to prevent the grease from escaping from the bearing, the hub portions 21 and spacing sleeves 5 and 6 being clamped together on shaft 1 by the pressure of washers 22 secured to shaft 1 by bolts 23. The rotary slide valves 3 and 4 act to close the exhaust ports 9 and 10 of the cylinders in the due moment, thus preventing the charging air from flowing off. The roller bearing 2 is enclosed in the real bearing body or housing 11 which is made in one piece, in the form of a hollow cylinder. As will be seen from Fig. 2, it is formed with hollow spaces 12 which are traversed by the cooling agent. The bearing body 11 is mounted with a tight fit along the overlapping sealing surfaces 20 between the cylinder jacket 13 and the exhaust connection 14 leading to the exhaust manifold 18, each of said parts enclosing one half of the circumference of the bearing body 11 with the manifold connection 14 being secured to the cylinder block as by flanges 19. When the exhaust connection 14 is removed, the bearing is held to the cylinder block by means of lugs 15, 16 cast on the bearing body. When assembling the slides, the shaft 1 is put into the semicircular recesses 17 of the cylinder blocks as a unit composed of the single slide elements and extending along the whole row of cylinders. The two ends of the bearing body 11 serve to define the position of the exhaust connection 14, whereby adjusting work is dispensed with and accurate alignment of the rotary slide shaft 1 is ensured.

While the invention has been described in detail with respect to a now preferred example and embodiment of the invention it will be understood by those skilled in the art after understanding the invention that various changes and modifications may be made without departing from the spirit and scope of the invention and it is intended, therefore, to cover all such changes and modifications in the appended claims.

What is claimed is:

1. In a multicylinder internal combustion engine having valve controlled exhaust ports in said cylinders and exhaust connections from individual cylinders to an exhaust manifold, the combination which comprises individual rotary valves for said ports, individual shafts connecting adjacent ends of adjacent said valves, bearings for rotatably supporting each said shaft disposed between said valves, cylindrical housings for said bearings, each said housing extending axially over its respective said shaft to substantially adjacent said valves, means for mounting said housings on said engine with said shafts and said valves coaxially aligned, semicircular surfaces on said exhaust connections, and means for mounting said exhaust connections on said engine over said exhaust ports and valves with said semicircular surfaces forming with end portions of said cylindrical housings a gas tight seal.

2. Structure for mounting a plurality of internal combustion engine rotary valves comprising in combination individual shafts connecting adjacent ends of adjacent said valves, a bearing for rotatably supporting each said shaft intermediate the ends thereof, a bearing housing for each said bearing extending axially along said shaft, an individual manifold connection for each said valve, a sealing surface on each said manifold connection, and means for individually and removably mounting said manifold connections on said engine overlying said valves with said sealing surfaces interfitting in sealing engagement with end portions of said housings.

3. Structure for mounting a plurality of internal combustion engine rotary valves comprising in combination individual shafts connecting adjacent ends of adjacent said valves, a bearing for rotatably supporting each said shaft intermediate the ends thereof, a cylindrical bearing housing for each said bearing extending axially along said shaft, an individual manifold connection for each said valve, a semicylindrical sealing surface on each said manifold connection, and means for individually and removably mounting said manifold connections on said engine overlying said valves with said sealing surfaces interfitting in sealing engagement with end portions of said housings.

4. Structure for mounting a plurality of coaxially aligned internal combustion engine rotary valves comprising in combination individual shafts connecting adjacent ends of adjacent said valves, a bearing for rotatably supporting each said shaft intermediate the ends thereof, a cylindrical bearing housing for each said bearing extending axially along said shaft, a plurality of coaxially aligned semicylindrical recesses in said engine for receiving said housings to maintain said valves and shafts coaxially aligned, an individual manifold connection for each said valve, a semicylindrical flange on each said manifold connection, and means for individually and removably mounting said manifold connections on said engine overlying said valves with said semicylindrical flanges interfitting in sealing engagement with end portions of said cylindrical housings.

5. In a bearing mounting for individually replaceable rotary exhaust port valves in a multicylinder internal combustion engine having an exhaust manifold, the combination which comprises a shaft connected to one end only of said valve, a bearing for rotatably supporting said shaft intermediate the ends thereof, a cylindrical housing for said bearing extending axially of said shaft substantially beyond said bearing, a semicylindrical recess in said engine adjacent said exhaust port for receiving said housing, an exhaust connection from said port to said manifold, a semicircular sealing surface on said exhaust connection, and means for mounting said exhaust connection and said cylindrical housing on said engine with said semicircular sealing surface overlapping end portions of said housing to form a gas tight seal.

6. A valve mounting arrangement adapted for the individual removal of rotary valves in a multicylinder internal combustion engine having a rotary valve and an individual manifold connection for each cylinder, which comprises in combination individual shafts connecting adjacent said valves, individual bearings for rotatably supporting said shafts intermediate the ends thereof, individual housings for said bearings, means for mounting said housings on said engine between adjacent said valves, and sealing surfaces on said manifold connections having sealing engagement with respective end portions of said housings.

7. A valve mounting arrangement in a multicylinder internal combustion engine having a rotary valve and an individual manifold connection for each cylinder, which comprises in combination individual shafts connecting adjacent said valves, individual bearings for rotatably supporting said shafts intermediate the ends thereof, individual housings for said bearings, means for mounting said housings on said engine between adjacent said valves, sealing surfaces on said manifold connections, and means for mounting said connections on said engine overlying said valves with said sealing surfaces overlapping end portions of said housings in sealing engagement.

8. Structure for mounting a series of coaxially aligned rotary exhaust valves in a multicylinder internal combustion engine having an individual exhaust manifold connection for each cylinder, comprising in combination a hub portion at each end of each of said valves, a shaft carrying at opposite ends thereof adjacent hub portions of two adjacent valves, a bearing intermediate the ends of said shaft for rotatably supporting said shaft on said engine, spacing members on said shaft for maintaining said hub portions spaced apart thereon, means for releasably securing said hub portions to said shaft to be rotatably driven thereby, a housing for said bearing, means for mounting said housing on said engine between adjacent said valves, and sealing surfaces on said exhaust manifold connections for sealing engagement with said housing.

9. Structure for mounting a series of coaxially aligned rotary exhaust valves in a multicylinder internal combustion engine having an individual exhaust manifold connection for each cylinder, comprising a hub portion at each of said valves, a shaft carrying at opposite ends thereof adjacent hub portions of two adjacent valves, releasable means for securing said hub portions at the ends of said shaft, a bearing intermediate the ends of said shaft for rotatably supporting said shaft, a bearing housing for enclosing said bearing and said shaft, packing means adjacent said bearings and within said housing interrupting axial passage along said shaft of gases and lubricants, means for mounting said housing on said engine with said shaft coaxially aligned with the other said shafts, and means for mounting said exhaust manifold connections on said engine overlapping end portions of said housings to form a gas-tight seal.

References Cited in the file of this patent

UNITED STATES PATENTS

| Re. 16,816 | Foss et al. | Dec. 13, 1927 |
| 1,068,481 | Cameron | July 29, 1913 |
| 1,318,781 | McKechnie | Oct. 14, 1919 |
| 1,465,142 | McKelvy | Aug. 14, 1923 |
| 1,583,260 | Russell | May 4, 1926 |
| 1,596,069 | Skiles | Aug. 17, 1926 |
| 1,774,881 | Fry | Sept. 2, 1930 |
| 1,776,665 | Riehm | Sept. 23, 1930 |
| 1,887,661 | Pielstick | Nov. 15, 1932 |
| 2,056,684 | McLaren | Oct. 6, 1936 |
| 2,076,976 | Burn | Apr. 13, 1937 |
| 2,148,249 | Thomas | Feb. 21, 1939 |
| 2,368,956 | Wehr | Feb. 6, 1945 |
| 2,474,879 | Winfield | July 5, 1949 |